(12) United States Patent
Derza (10) Patent No.: US 11,502,976 B1
(45) Date of Patent: Nov. 15, 2022

(54) AUTOMATED AGENT MESSAGING SYSTEM

(71) Applicant: WALGREEN CO., Deerfield, IL (US)

(72) Inventor: Oliver Derza, Willowbrook, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

(21) Appl. No.: 17/178,374

(22) Filed: Feb. 18, 2021

(51) Int. Cl.
| | |
|---|---|
| *H04L 51/02* | (2022.01) |
| *G06Q 10/10* | (2012.01) |
| *G06F 16/33* | (2019.01) |
| *G06N 20/00* | (2019.01) |
| *G06Q 30/00* | (2012.01) |

(52) U.S. Cl.
CPC .......... *H04L 51/02* (2013.01); *G06F 16/3344* (2019.01); *G06N 20/00* (2019.01); *G06Q 10/107* (2013.01); *G06Q 30/016* (2013.01)

(58) Field of Classification Search
None
See application file for complete search history.

(56) References Cited

U.S. PATENT DOCUMENTS

| | | | | |
|---|---|---|---|---|
| 10,083,451 | B2* | 9/2018 | Sehrawat | G06F 21/31 |
| 11,093,110 | B1* | 8/2021 | Bossio | G06F 3/04817 |
| 2009/0228583 | A1* | 9/2009 | Pocklington | H04L 51/00 |
| | | | | 709/224 |
| 2015/0269125 | A1* | 9/2015 | Desai | G06F 40/103 |
| | | | | 715/752 |
| 2018/0006979 | A1* | 1/2018 | Barsness | G06F 40/253 |
| 2019/0347319 | A1* | 11/2019 | Goyal | G10L 15/32 |
| 2020/0125967 | A1* | 4/2020 | Seo | G06N 20/00 |
| 2021/0073474 | A1* | 3/2021 | Sengupta | G06N 5/02 |
| 2021/0097240 | A1* | 4/2021 | Singh | G06F 40/30 |
| 2021/0157990 | A1* | 5/2021 | Lima | H04L 51/02 |
| 2021/0256215 | A1* | 8/2021 | Oddy | G06F 40/30 |
| 2021/0258270 | A1* | 8/2021 | Mitchell | H04L 51/063 |

* cited by examiner

*Primary Examiner* — Scott B Christensen
(74) *Attorney, Agent, or Firm* — Marshall, Gerstein & Borun LLP; Randall G. Rueth (57) ABSTRACT

Methods and systems disclosed herein can assess electronic messages exchanged between messaging applications, by receiving a first version of an electronic message generated by a messaging application for review by an automated agent messaging application prior to delivery of the electronic message to an electronic device operated by a customer, the electronic message having textual content intended for the customer from an agent associated with the enterprise; automatically generating, by the automated agent messaging application, a second version of the electronic message using one or more machine learning-based models, wherein the second version of the electronic message is an adaptation of the textual content of the first version of the electronic message while maintaining an intent of the first version of the electronic message; and transmitting, to a computing device via a network, the second version of the electronic message.

18 Claims, 3 Drawing Sheets

AUTOMATED AGENT MESSAGING SYSTEM

TECHNICAL FIELD

This application generally relates to an automated agent messaging system which adapts a message intended for a customer and proposed by an agent associated with an enterprise based on one or more machine learning-based models.

BACKGROUND

In some situations, an agent associated with an enterprise, such as an employee, may desire to communicate messages (e.g., e-mail messages, text messages, or other suitable written messages) with a customer to provide satisfactory customer service. For example, a beauty consultant of an enterprise may desire to send an e-mail message to the customer, including content such as "Thanks for stopping by, it was nice to see you. I hope the products that we talked about worked out for you" or "We just got a new shipment for a product that I think you will love, please let me know if you would like to schedule an appointment." However, for various reasons, the enterprise may desire to manage, control, or supervise the content of the messages proposed by agents that is delivered to customers. For example, the enterprise may want to ensure that messages reflect standards or core values of the enterprise. Other reasons for managing the content of the messages may relate to privacy, legal, and other policy-related enforcements.

The enterprise may consider using conventional techniques of utilizing a simple, predefined decision tree to generate default messages for an agent that are then made available (e.g., in a dropdown list included in a graphical user interface (GUI) of an application) for the agent to select from and send to the customer. Typically, these simple decision trees are static, and cannot dynamically expand to generate additional default messages for an agent. As such, these conventional techniques can result in a very tedious and time consuming process for the agent, especially if the agent is to read through numerous default messages to search for the appropriate message having the content intended by the agent. Further, the default messages available for the agent may be inaccurate or otherwise irrelevant to what the agent desires to communicate to the customer. For example, a sales associate of an enterprise may desire to send a text message to the customer, including a recalled personal narrative such as "Did you end up travelling to Disney World?" Simply put, conventional techniques are unable to curate datasets from a large number of customer-agent relationships and conversations resulting from those relationships, and further process the datasets to establish meaningful messages for the agent.

SUMMARY

Generally, an automated agent messaging system (AAMS) configured to adapt a message intended for a customer and proposed by an agent (e.g., employee) associated with an enterprise based on one or more machine learning-based models is described in this disclosure. The AAMS is generally configured to receive a first version of a message, i.e., textual input (e.g., phrases, strings, sentences, etc.) from an electronic device operated by an agent, and to analyze the textual input using one or more machine learning-based models to generate (i) an intent of the message and (ii) a second version of the message, i.e., textual output (e.g., phrases, strings, sentences, etc.), based on the intent of the first version of the message, that is considered to be approved by the enterprise for delivery to an electronic device operated by a customer. The one or more machine learning-based models can be trained, or fit, in an offline or online fashion by a machine learning (ML) training module to understand and process textual data. The one or more machine learning-based models can be configured for text/intent classification, named entity recognition (NER), sentiment analysis, co-reference, reading comprehension, text generation, feature extraction, summarization, mask filling and/or automated knowledge base construction, to name a few. As such, the techniques described herein overcome deficiencies of the prior art by providing an integrated method embodied in computer software based on machine-learning for use with a computer for the rapid manipulation of a large dataset of textual input, thereby allowing for rapid, creative, and expressive messages to be produced in real-time.

In an embodiment, a method for assessing electronic messages exchanged between messaging applications includes receiving, by a computing system of an enterprise via one or more networks, a first version of an electronic message generated by a messaging application for review by an automated agent messaging application prior to delivery of the electronic message to an electronic device operated by a customer, the electronic message having textual content intended for the customer from an agent associated with the enterprise. The method additionally includes, in response to receiving the first version of the electronic message, automatically generating, by the automated agent messaging application, a second version of the electronic message using one or more machine learning-based models, wherein the second version of the electronic message is an adaptation of the textual content of the first version of the electronic message while maintaining an intent of the first version of the electronic message. The method additionally includes transmitting, to a computing device via the one or more networks, the second version of the electronic message.

In another embodiment, a server of an enterprise, for assessing electronic messages exchanged between messaging applications, includes one or more processors configured to receive, via one or more networks, a first version of an electronic message generated by a messaging application for review via an automated agent messaging application executable by the one or more processors prior to delivery of the electronic message to an electronic device operated by a customer, the electronic message having textual content intended for the customer from an agent associated with the enterprise. The one or more processors are also configured to, in response to the first version of the electronic message, automatically generate, via the automated agent messaging application, a second version of the electronic message using one or more machine learning-based models, wherein the second version of the electronic message is an adaptation of the textual content of the first version of the electronic message while maintaining an intent of the first version of the electronic message. The one or more processors are also configured to transmit, to a computing device via the one or more networks, the second version of the electronic message.

In yet another embodiment, a computing device for assessing electronic messages includes memory storing a messaging application, and one or more processors coupled to the memory. The one or more processors are configured to execute the messaging application to receive a first version of an electronic message having textual content intended for a customer from an agent associated with the enterprise. The one or more processors are also configured to automatically generate a second version of the electronic message using one or more machine learning-based models prior to delivery of the electronic message to an electronic device operated by a customer, wherein the second version of the electronic message is an adaptation of the textual content of the first version of the electronic message while maintaining an intent of the first version of the electronic message. The one or more processors are also configured to transmit, to the electronic device via one or more networks, the second version of the electronic message.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Figure 1:
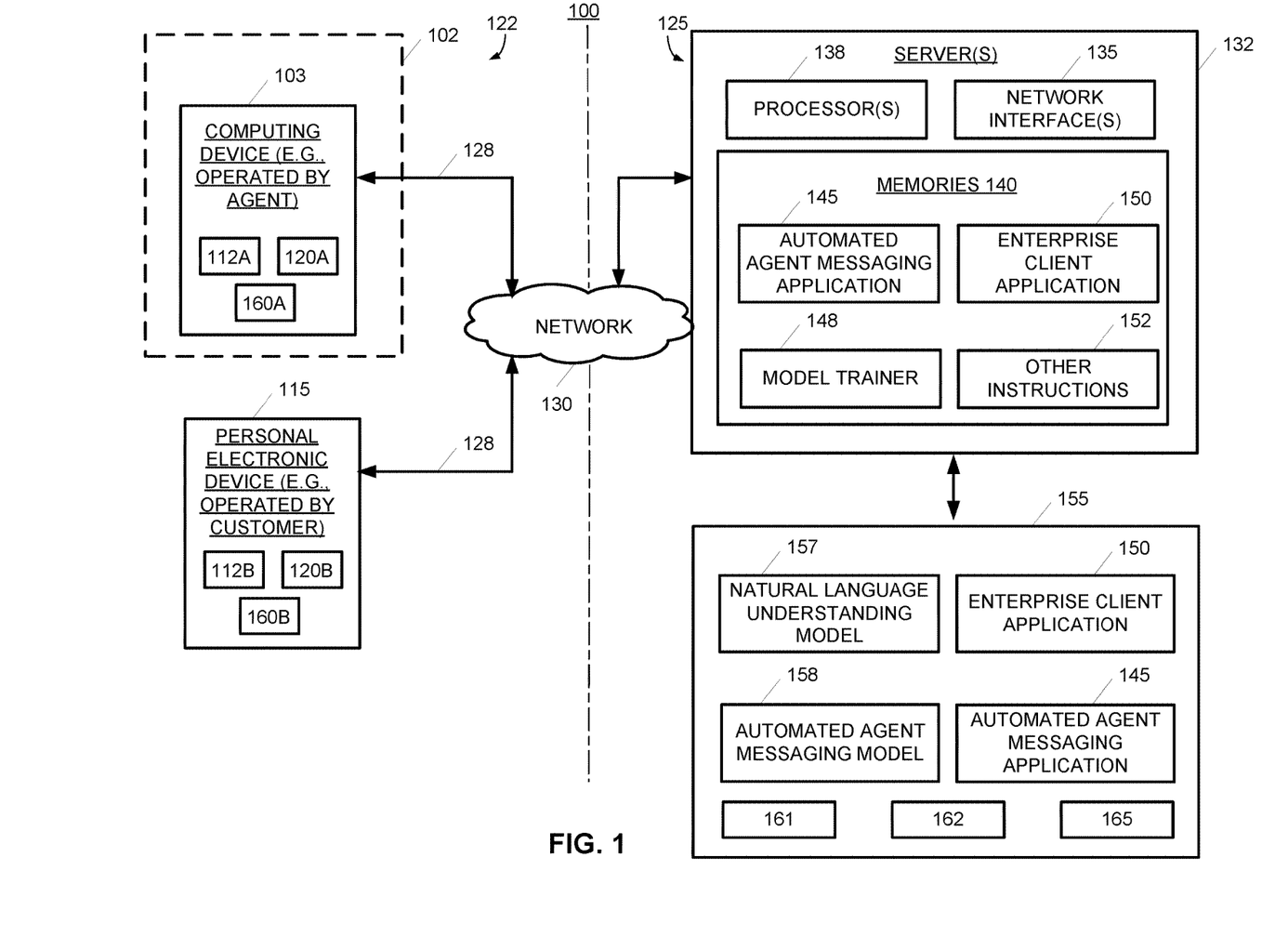
FIG. 1 depicts a block diagram of an example system of an enterprise which includes an automated agent messaging system (AAMS), in accordance with the principles and techniques described herein.

FIG. 1 illustrates an embodiment of a system 100 which includes an example automated agent messaging system (AAMS). The AAMS 100 may be a machine learning (ML) system, in an embodiment.

The AAMS 100 may include a combination of hardware, firmware, and software components, as well as various data communication channels for communicating data between and among the various hardware, firmware, and software components. The AAMS 100 may be owned and/or operated by an enterprise or organization, such as a pharmacy, beauty shop, or other suitable type of business. Generally, but not necessarily, the enterprise may include one or more physical storefronts or physical locations 102 at which one or more local or front-end computing devices 103 of the enterprise may, but not necessarily, be disposed. Examples of physical storefronts of the enterprise may include brick-and-mortar stores, retail operations hosted within other buildings (such as hospitals, university buildings, shopping malls, airports, etc.), pop-up stores or locations, designated pick-up and/or distribution locations, and the like, each of which may have a respective mailing (e.g., postal) address. Examples of computing devices 103 may include local servers that service their respective physical storefront location, as well as computing devices (which may be stationary or mobile computing devices) which are individually operated by employees and/or agents of the enterprise (such as pharmacists, register personnel, beauty consultants, sales associates, account managers, order fulfillment personnel, retail floor staff, etc.). The employees and/or agents may interact (e.g., in person, virtually, etc.) with customers of the enterprise, and the customers may operate their own personal electronic devices (PEDs) 115. Each of the computing devices 103 and PED 115 may be, for example, a personal computer, a cellular phone, a smart device, a mobile communications device, a tablet, a laptop, another type of handheld electronic device, a desktop computer, etc.

The local computing devices 103 and PED 115 are collectively referred to herein as "front-end components 122" of AAMS 100. AAMS 100 may also include a set of "back-end components 125," as depicted in FIG. 1. Communicative connections or links 128 between the front-end components 122 and the back-end components 125 may be established through one or more digital data and/or communications networks 130. The digital network(s) 130 may include a proprietary network, a secure public Internet, a virtual private network, and/or some other type of network, such as dedicated access lines, plain ordinary telephone lines, satellite links, wireless links, wired links, combinations of these, etc. Where the digital network 130 comprises the Internet or other IP-based communication network, data communication may take place over the digital network 130 via a protocol of the Internet protocol suite (e.g., TCP/IP, UDP, SCTP, various application layer protocols, etc.). Generally speaking, the communicative connections or links 128 which are established between the front-end components 122 and the back-end components 125 may be implemented by using any known communication technique, such as by establishing sessions there between, tunneling, circuit-switching, virtual circuit switching, etc.

Generally, each of the front-end components 122 can execute various computer-implemented applications. For example, a computing device 103 can execute a messaging application 160a to send/receive a message via the network 130 to/from a PED 115 executing a messaging application 160b. Messaging applications 160a, 160b can be an instant messaging service (e.g., iMessage by Apple, WhatsApp, etc.), e-mail application (e.g., GMail, Outlook, Yahoo), or any other suitable application provided by a third party (i.e., not the enterprise) for sending and receiving textual data. As another example, a computing device 103 can execute a browser 120a (e.g., Microsoft Explorer, Google Chrome) to send/receive a message over a web application or service (e.g., www.gmail.com) via the network 130 to/from a PED 115 executing a browser 120b. In yet another example, a computing device 103 can execute an enterprise client application 112a (i.e., provided by the enterprise) to send/receive a message via the network 130 to/from a PED 115 executing a client application 112b. As such, the enterprise client applications 112a, 112b may contain its own messaging functionality, and optionally, other services (e.g., purchase merchandise or services offered by the enterprise). Using any of the applications described above and/or other components (e.g., speaker, microphone, etc.) included in each of the front-end components 122, an electronic communication channel (e.g., email, text, phone, etc.) may be established between a computing device 103 operated by an agent and a PED 115 operated by a customer.

The back-end components 125 of AAMS 100 may include one or more servers or computing devices 132, which are interchangeably referred to herein as "the back-end servers 132" or "the back-end computing devices 132." The one or more back-end computing devices 132 may be implemented, for example, by a bank of servers, a cloud computing system, one or more networked computing devices, or any other suitable arrangement of one or more computing devices. The back-end computing devices 132 may include one or more network interfaces 135 that communicatively connect the back-end computing devices 132 to the network(s) 130, the local computing devices 103 associated with the physical storefronts 102, and the PED 115. Additionally, the back-end computing devices 132 may include one or more processors 138 and one or more tangible, non-transitory memories 140 on which programs, applications, modules, instructions, and/or routines 145-152 pertaining to the enterprise are stored. For example, the one or more memories 140 may store an automated agent messaging application or module 145, a model training module or component 148, an enterprise client application 150, and/or other modules, components, programs, applications, etc. 152, each of which comprises respective computer-executable instructions that are executable by the one or more processors 138. In some embodiments, instances of the enterprise client application 150 may be downloaded into various computing devices 103 and PEDs 115 (as shown by elements 112a, 112b) for execution thereon. Some or all of these programs, applications, modules, instructions, and/or routines 145-152 may process an incoming message intended for a customer and proposed by an agent or employee operating a computing device 103 (e.g., via application 112a, 120a, or 160a), and provide a revised message back to either the computing device 103, e.g., in a manner such as described in more detail elsewhere within this disclosure. In turn, the agent or employee can provide the revised message to the customer operating a PED 115 (e.g., via application 112b or 160b). In some cases, some or all of these programs, applications, modules, instructions, and/or routines 145-152 may process an incoming message and provide the revised message directly to the PED 115.

Additionally, the back-end computing devices 132 may include and/or may be communicatively connected to one or more data stores 155, where the one or more data stores 155 comprise one or more tangible, non-transitory data storage devices which are particularly adapted to store data related to the operations of AAMS 100. It should be appreciated that although the data stores 155 are shown in FIG. 1 as a single data storage entity, the data stores 155 may be implemented using one or more databases and/or one or more data storage devices. For example, the data stores 155 may be implemented by a data bank or a data cloud. It should be noted that, while not shown, additional databases and/or data stores may be linked to the one or more back-end servers 132 in a known manner.

As shown in FIG. 1, the data stores 155 store the automated agent messaging application or module 145, enterprise client application 150, a natural language processing (NLP) or understanding (NLU) model 157 (hereinafter referred to simply as "NLU"), and an automated agent messaging model 158. The automated agent messaging application or module 145 may utilize the NLU model 157 and the automated agent messaging model 158 to adapt a message intended for a customer and proposed by an agent or employee. For example, in an effort to maintain a certain level of professionalism, the automated agent messaging application or module 145 can receive an incoming message (or a copy thereof) that indicates a content of "Yo, what's up? Did you like the face cream that I picked out for you?" from a computing device 103 via network 130, and in response, generate a revised message that indicates a content of "Hello, thank you for shopping with us. Would you be interested in providing feedback for your latest purchase?" As another example, in an effort to maintain a certain level of privacy or abide by consumer protection laws, the automated agent messaging application or module 145 can receive an incoming message (or a copy thereof) that indicates a content of "I can't believe you didn't like the face cream that I picked out for you. You're impossible!" from a computing device 103 via network 130, and in response, generate a revised message that indicates a content of "We are sorry to hear that. Would you like to speak with a customer representative so that we may better assist you in the future?" Of course, other examples are contemplated, some of which are described below.

In some embodiments, the revised message may include customized or personalized content in addition to that of the original incoming message. Using the above message of "Yo, what's up? Did you like the face cream that I picked out for you?" as an example, the automated agent messaging application or module 145 can generate a revised message that indicates a content of "Hello, thank you for shopping with us. Would you be interested in providing feedback for your latest purchase? Please enjoy this 15% coupon on your next purchase of the Olay Regenerist Micro-Sculpting Face Cream." By tracking customer data and historical data associated with the customer described below, such as prior purchases of products or services by the customer, the automated agent messaging application or module 145 may obtain customized or personalized content for inclusion into the revised message.

For example, the data stores 155 may store customer profile data 162. The customer profile data 162 may include a plurality of profiles of a plurality of customers associated with the enterprise, e.g., clients, registered users, etc. Each customer profile may be associated with a particular individual customer, and may be uniquely identified within AAMS 100 by a respective enterprise customer identifier. For example, an enterprise customer identifier may comprise a set of alphanumeric and/or other types of characters that are assigned by the enterprise to uniquely identify a particular customer to the enterprise in one or more databases operated by the enterprise. Each customer profile may store data corresponding to its respective customer, such as his or her name, login credentials (e.g., user login name, password, passphrase, passcode, answers to security questions, biometric data, etc.), contact information (e.g., address, phone numbers, email addresses, etc.), account information, user preferences, purchase history, return history, stored payment options, prescriptions that have been ordered and filled, rewards and/or loyalty account data, information indicative of transactions between the respective customer and the enterprise, information indicative of contact between the customer and the enterprise and the substance of the contact (e.g., interactions that have taken place via the enterprise application 150 and/or instances thereof, messaging applications 160a, 160b, browsers 120a, 120b, via in-person visits to storefront locations 102, via phone call, etc.), and/or other types of information related to the customer and the enterprise. A customer's profile can store a record of orders which have been placed via the customer's account, items included in each order, and the respective statuses of the orders, e.g., filling in progress, filled and awaiting pickup, filled and picked-up, filled and shipped, canceled, other stages of order fulfillment, etc. In some instances, a customer's profile may store an indication of any subsequent customer activities corresponding to an order. A "subsequent" customer activity, as generally utilized herein, refers to an activity which a customer initiates with the enterprise after the order has been placed and which, in most situations, relates to the order, e.g., item return, customer email or text inquiring about an item in the order or a related phone call about an item in the order, the order itself as a whole, a related item, etc. Subsequent customer-initiated activities may occur via the electronic communication channels (e.g., email, text, phone, etc.) established between an agent operating a computing device 103 and a customer operating a PED 115.

Still further, the data stores 155 may store historical data 165 related to the enterprise. The historical data 165 may include historical data indicative of various aspects and/or characteristics of a plurality of orders placed by a plurality of customers with the enterprise, items included in the orders, subsequent customer activities related to the orders and/or to the items in the orders (e.g., interactions of customers with the enterprise via various contact and/or communication channels) at various stages of order fulfillment and after orders have been filled and/or picked up, enterprise activities related to the orders and/or to the items in the orders at various stages of order fulfillment, locations (e.g., physical or electronic) at which orders were placed, physical locations at which orders were picked up, among other types of historical data. For example, the historical data may also include indications of customer preferences, customer history of subsequent activities related to specific ordered items, seasonality (e.g., holidays, back-to-school, month of the year, etc.), customer demographics, weather conditions, other external events or conditions (e.g., major sporting events in the vicinity of the location, convention or conference activity in the vicinity of the location, proximity of location to office buildings or schools, etc.), to name a few.

The back-end computing devices or servers 132 may access the data stored in the data stores 155 when executing various functions and tasks associated with the operation of AAMS 100. For example, the automated agent messaging application or module 145 at the back-end servers 132 may perform a procedure involving one or more computer models: (1) access the NLU model 157 to determine the intent of an incoming message from an agent that is intended to be delivered to a customer, such as a customer serviced by the agent; and use the intent determined by the NLU model 157 to generate a revised version of the message; and optionally (2) access the automated agent messaging model 158 to generate further contextual information to include in the revised version of the message, e.g., in manners such as described elsewhere within this disclosure. In some cases, the automated agent messaging application or module 145 may access the customer profile data 162 and/or historical data 165 to generate the contextual information to enhance the incoming message by including the contextual information in the revised version of the message, e.g., in manners such as described elsewhere within this disclosure.

In some embodiments, the automated agent messaging application or module 145 can determine the sender (i.e., agent) of the incoming message according to identification information (e.g., email address of the agent, phone number of the agent) included in the incoming message, and transmit the revised version of the message back to the agent so that the agent can transmit the revised version of the message to the customer. Data stores 155 may store agent profile data 161, which may include a plurality of profiles of a plurality of agents associated with the enterprise. Each agent profile may be associated with a particular agent, and may be uniquely identified within AAMS 100 by a respective enterprise agent identifier (e.g., login credentials, contact information like e-mail address or phone number, etc.), similar to the customer identifier described above. An agent's profile can store a record of original messages transmitted to the automated agent messaging application or module 145 for approval, and/or revised messages generated by the automated agent messaging application or module 145 in response to receiving the original messages.

In some embodiments, the automated agent messaging application or module 145 can determine the recipient (i.e., customer) to whom the sender (i.e., agent) of the incoming message intended to send the message to, according to identification information (e.g., name) included in the incoming message. The automated agent messaging application or module 145 can compare the name of the customer indicated in the incoming message to the customer profile data 162. If the name of the customer exists in a certain customer profile included in the customer profile data 162, the automated agent messaging application or module 145 can identify the contact information (e.g., email address, phone number) stored in the customer profile and transmit revised messages generated by the automated agent messaging application or module 145 in response to receiving the original messages directly to the customer.

The back-end servers 132 may store, maintain, and update various data stored in the data stores 155. For example, the automated agent messaging application or module 145 and optionally other instructions 152 may update the historical data 165 to include any messages which have been collected from agents (e.g., as indicated by computing devices 103), intents of those messages, as well as any revised messages generated. As another example, the enterprise client application 150 and optionally other instructions 152 may receive customer orders, route orders to fulfillment locations, updated passwords, user preferences, and default payment methods for various customers within the customer profile data 162, etc. (e.g., as indicated by PED 115). In yet another example, the automated agent messaging application or module 145 and optionally other instructions 152 may create, update and/or train (e.g., via the model trainer 148) the NLU model 157 and/or the automated agent messaging model 158, e.g., by utilizing the historical data 165, the customer profile data 162, and/or updates thereto, as is discussed in more detail elsewhere within this disclosure.

As previously mentioned, the one or more memories 140 of the back-end servers 132 may contain or be configured with machine- or computer-readable or computer-executable instructions or modules (e.g., software) 145-152 for execution by the one or more processors 132. For example, the sets of instructions 145-152 may be implemented as programs, applications, instructions, services, modules, routines, and the like, which may be executed by the one or more processors 132 to perform various tasks associated with receiving incoming messages proposed by agents, analyzing the incoming messages to determine intents of the incoming messages, generating revised versions of those messages while maintaining the intents, transmitting the revised versions of messages to the agents or customers, generating and updating the NLU model 157 and/or automated agent messaging model 158, as well as to perform various tasks associated with operation of the enterprise. In an embodiment, some of the instructions 145-152 may comprise respective sets of computer-executable instructions which, when executed by the processor 132, cause AAMS 100 to execute at least a portion of embodiments of any of the methods described herein, such as the method 200 and/or the method 300. In some embodiments, one or more of the sets of instructions 145-152 may operate in conjunction with one or more front-end components 122 (e.g., in conjunction with applications 112a, 112b, 160a, 160b, 120a, 120b, messaging application or module 145, etc.) to perform various tasks associated with generating messages for customers that are deemed to be approved by the enterprise, to perform at least portions of one or more of the methods described herein, and/or to perform various tasks associated with the operations of the enterprise.

Generally speaking, and as is described in more detail elsewhere within this disclosure, the automated agent messaging application or module 145 may manage and administer automated agent messaging processing and applications, data, tasks, and actions associated therewith across AAMS 100, e.g., at various PEDs 115 or at various local, computing devices 103. For example, the automated agent messaging application or module 145 may receive an incoming message from a computing device 103, generate a revised message, and transmit the revised message back to the computing device 103, so that the computing device 103 can deliver the revised message to a PED 115. As another example, the automated agent messaging application or module 145 may transmit the revised message directly to the PED 115. The automated agent messaging application or module 145 may also access the NLU 157, automated agent messaging model 158, historical data 165, customer profile data 162, and/or agent profile data 161 on behalf of applications 112*a*, 120*a*, 160*a*, in some situations.

It will be appreciated that although only one computing device 132 is depicted in FIG. 1 as being included in the back-end components 125, multiple computing devices 132 may be provided for the purpose of distributing server load, serving different web services, implementing different portions of an electronic web interface, servicing different enterprise client applications executing in multiple front-end components 122, servicing different automated agent messaging applications, etc.

Although the automated agent messaging application or module 145 and enterprise client application 150 are depicted as separate applications, in some embodiments, the functionalities of the automated agent messaging application or module 145 may be incorporated into the enterprise client application 150. In such embodiments, when instances of the enterprise client application 150, along with other components that are utilized by the enterprise client application 150 (e.g., NLU 157, automated agent messaging model 158) are downloaded into a computing device 103 (e.g., as enterprise client application 112*a*) and stored in one or more memories of the computing device 130, one or more processors of the computing device 103 can locally execute the enterprise client application 150 without communicating with the back-end computing devices 132 to adapt messages intended for a customer. Similarly, in other embodiments, the functionalities of the automated agent messaging application or module 145, NLU 157, and automated agent messaging model 158 may be incorporated into the messaging application 160*a*, so that one or more processors of the computing device 103 can locally execute the messaging application 160*a* without communicating with the back-end computing devices 132 to adapt messages intended for a customer. As such, in either of these embodiments, the computing device 103 can, upon executing a messaging application (e.g., via application 112*a*, 120*a*, or 160*a*), receive a message intended for a customer and proposed by an agent or employee operating the computing device 103, and provide a revised message (e.g., via display screen at the computing device 103). In turn, the agent or employee can send the revised message to the customer operating a PED 115 (e.g., via application 112*b* or 160*b*). In this way, the agent or employee may be notified of the revised message in real-time.

For example, when operating the computing device 103 executing a messaging application, an agent or employee may input the message "hey Meghan, whats up?" intended for a customer via a keyboard associated with the computing device 103. As the agent or employee is inputting the message, the computing device 103 can display the revised message "Hello Meghan, I hope all is well." The messaging application may be configured to simultaneously indicate a representation of the original message and the revised message on the display screen of the computing device 103, so that the agent is aware that the revised message is the suggested message to send to the customer. The messaging application may be configured to replace the original message with the revised message when the agent or employee provides a user input (e.g., selecting the revised message, clicking "OK," etc.) indicating approval of the revised message. If the agent or employee proceeds to include additional textual content in the revised message prior to sending the revised message to the customer, the messaging application can again automatically generate revised content for the additional textual content if necessary, and display the fully revised message. For example, if the agent or employee adds additional textual content "How was Vegas," to the revised message, the computing device 103 can display the fully revised message "Hello Meghan, I hope all is well. I hope you enjoyed your vacation." As such, the messaging application can be configured to suggest revisions for the original message as the agent or employee is inputting the message (e.g., after a word, phrase, sentence, etc.). After the agent or employee completes entry of the message and all portions of the message have been evaluated and revised as necessary, the computing device 103 transmits the revised message to the PED 115 operated by the customer.

Figure 2:
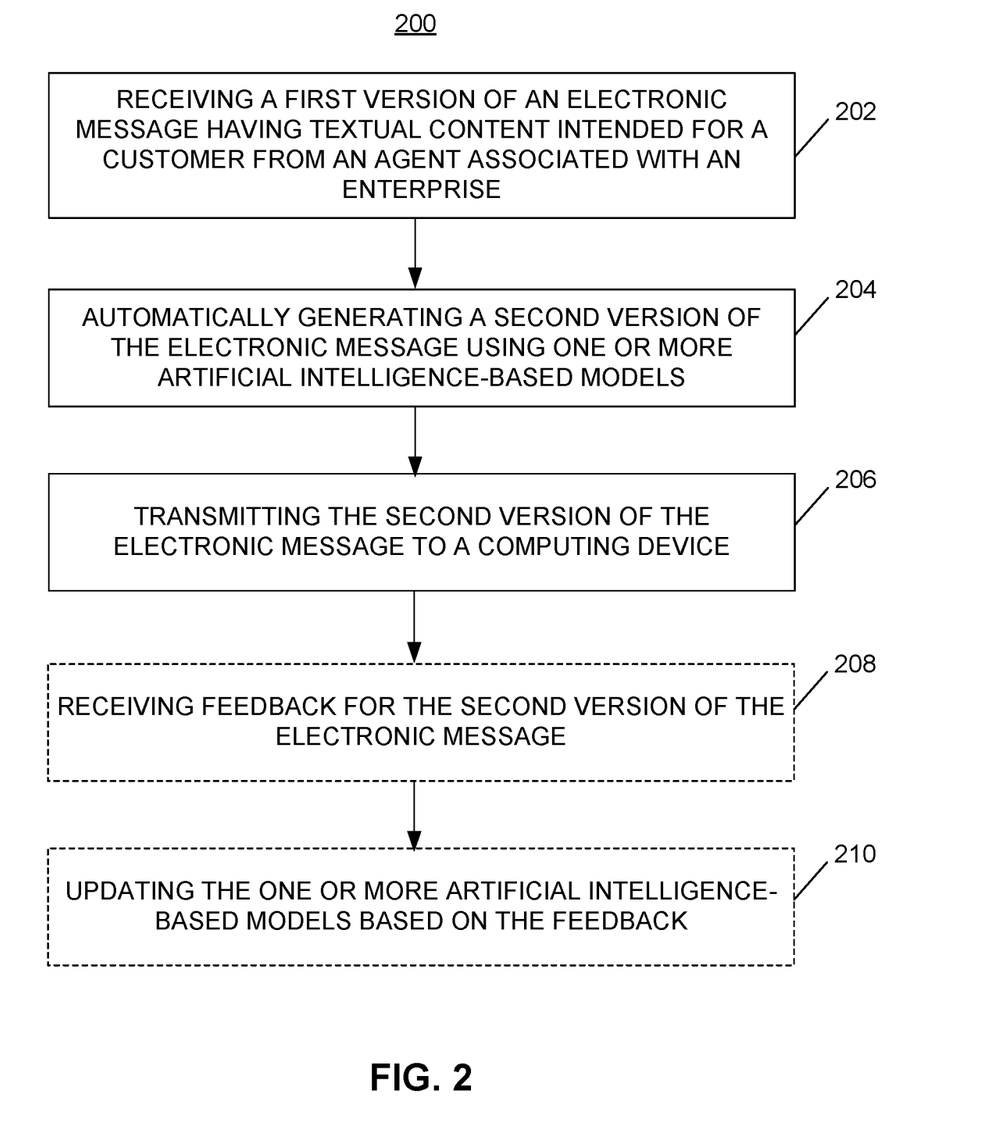
FIG. 2 depicts a flow chart of an example method for automatically generating a second version of a message in response to a first version of the message provided by an agent associated with an enterprise.

FIG. 2 depicts a flow chart of an example method 200 for automatically generating, based on a first version of a message received from an agent and intended for a customer, a second version of the message approved for transmission to the customer. The method 200 may operate in conjunction with embodiments of at least a portion of AAMS 100 of FIG. 1 and any one or more components and/or devices related thereto (such as, for example, the back-end components 125, the local components 103, the network(s) 130, the PEDs 115, etc.), and/or with other systems, processors, databases and/or devices. For example, one or more of the back-end system components 125 and/or one or more components of the front-end system components 122 may execute an instance of the method 200, either individually or jointly. For ease of discussion, though, and not for limitation purposes, the method 200 is discussed with simultaneous reference to FIG. 1. Further, the method 200 may include additional or alternate steps other than those described with respect to FIG. 2, in some embodiments.

At block 202, the method 200 may include receiving, by a computing system (e.g., server 132) of the enterprise, a first version of an electronic message having textual content intended for a customer from an agent associated with the enterprise. The first version of the electronic message can be generated by the agent via a messaging application (e.g., applications 112*a*, 160*a* or browser 120*a*) for review by an automated agent messaging application (e.g., application or module 145) prior to delivery of the electronic message to an electronic device (e.g., PED 115) operated by the customer. In some implementations, an application (e.g., automated agent messaging application or module 145, enterprise client application 150) executing at the computing system may receive a wireless electronic signal indicative of the first version of the electronic message. The agent can input the first version of the electronic message via a user interface (e.g., via touchscreen, keyboard, microphone, etc.) of a computing device (e.g., device 103) on which the messaging application is executed, and the computing device can initiate the establishment of a communication channel between the computing device operated by the agent and the enterprise computing system.

In response to receiving the first version of the electronic message, the method 200 at block 204 may include automatically generating a second version of the electronic message using one or more machine learning-based models (e.g., NLU model 157, automated agent messaging model 158). The automated agent messaging application can generate the second version of the electronic message by adapting the textual content of the first version of the electronic message while maintaining an intent of the first version of the electronic message.

To generate the second version of the electronic message, the automated agent messaging application can begin by applying an NLU model (e.g., NLU model 157) to the textual content included in the first version of the message to determine the intent of the first version of the electronic message. The NLU model can be an off-the-shelf model (e.g., Microsoft's Azure Language Understanding Intelligence Service (LUIS)) or specially developed, e.g., by the enterprise, to interpret messages commonly exchanged during a customer service interaction between an agent and customer.

Generally, the computer-implemented NLU model, upon receiving the first version of the electronic message, can utilize linguistic rules (e.g., grammar, sarcasm, idioms, metaphors, usage exceptions, variations in sentence structure) to break down the content included in the first version of the electronic message into manageable segments (e.g., word, phrase within a sentence, sentence, etc.) that assists a computer to make sense of the intent of the content using natural language processing techniques. Using techniques related to text/intent classification, named entity recognition (NER), sentiment analysis, co-reference, reading comprehension, text generation, feature extraction, summarization, mask filling and/or automated knowledge base construction to name a few, the NLU model can be configured to analyze the content included in the first version of the electronic message to identify concepts, keywords, categories, semantics, and emotions that ultimately reveals the intent behind the message.

For example, the automated agent messaging application may receive an incoming first version of an electronic message, the content of which are as follows: "Hi there, it was great to see you yesterday. Did you end up travelling to Disney World? Just wondering if you had an opportunity to try out the face cream that I picked out for you. We just received a new shipment of cosmetics that I think you'll love—would be happy to assist you again." Utilizing an exemplary NLU model, the automated agent messaging application may break down the content into four sentences and identify an intent for each of the sentences according to keyword(s). The NLU model may determine that the word "Hi" in the first sentence suggests an agent's intent of initiating a greeting, the proper noun "Disney World" or word "travel" in the second sentence suggests an agent's intent of recalling a personal narrative mentioned by the customer, the phrase "did you try out" in the third sentence suggests an agent's intent of a follow-up inquiry, and that the phrase "new shipment" and/or "I think you'll love" in the fourth sentence suggests an agent's intent of providing a product recommendation.

Using the intents (e.g., greeting, personal narrative, follow-up, product recommendation) determined by the NLU model, the automated agent messaging application may be configured to query a plurality of predefined messages stored in a database (e.g., historical data 165) that are indexed to a plurality of respective intents. The plurality of predefined messages may have been initially defined by an administrator of the enterprise computing system. For example, if the database includes the intents of "greeting", "follow-up", and "product recommendation" corresponding to predefined messages of "Hello, thank you for shopping with us," "We hope you are enjoying your latest purchase," and "Would you like to hear about specials for similar products?" respectively, the automated agent messaging application may select the aforementioned predefined messages as a collective second version of the incoming first version of the message after comparing the intents determined by the NLU model to the intents already mapped to predefined messages in the database. In this way, the automated agent messaging application can generate the second version of the message based on the first version of the message, such that the second version of the message is an adaptation of the textual content of the first version of the message while maintaining the intent of the first version of the message.

The plurality of predefined messages stored in the database can be expanded upon to include additional messages as a result of iterations of the automated agent messaging application generating messages. In some embodiments, if the database does not include an intent recognized by the NLU model for an incoming first version of the message, the automated agent messaging application may automatically flag the incoming first version of the message to indicate that a new intent has been identified and is currently unaddressed by the automated agent messaging application or otherwise not already accounted for by the database. For example, if the database does not include an intent of "personal narrative" recognized by the NLU model (e.g., via NER techniques), the database may be updated to include the new intent. An administrator of the enterprise computing system may notice the flag, review the first version of the message and its intent, and add the intent and a second version of the message as one or more new entries in the database. Accordingly, the next time the automated agent messaging application queries the database to locate a predefined message indexed to the intent that has been added by the foregoing process, the automated agent messaging application may identify a predefined message stored in the database that is indexed to the newly added intent. In this way, the automated agent messaging application can address computational scalability deficiencies of conventional techniques by curating new data points from the agent's first version of the message as a result of the agent's conversations with a customer, and further processing the new data points to automatically and dynamically increase the number of predefined messages that are meaningful and consistent with the intentions of the agent.

In some embodiments, the automated agent messaging application may customize or enhance the plurality of predefined messages stored in the database. In one embodiment, the automated agent messaging application may translate the second version of the message into another language. For example, if the automated agent messaging application determines that the customer to whom messages are intended prefers to communicate in the Spanish language (e.g., based on a language preference stored as customer profile data 162), the automated agent messaging application may translate the second version of the message from its original language (e.g., English) into Spanish. In another embodiment, the automated agent messaging application may generate additional textual content to add to the second version of the message relative to the first version of the message. For example, to further personalize and/or contextualize the second version of the message "Hello, thank you for shopping with us. We hope you are enjoying your latest purchase. Would you like to hear about specials for similar products?," the automated agent messaging application may generate the following second version of the message: "Hello, thank you for shopping with us. We hope you are enjoying your latest purchase of the face cream. Would you like to hear about specials for hand lotions?" In some cases, the additional textual content added to the predefined messages may depend on the demographic (e.g., age, address, etc. stored as customer profile data 162) of the customer to whom messages are intended, or other external factors like weather. For example, if the customer is within the ages of 18-30, the additional textual content may include a link to a social media page, assuming that customers within these age ranges generally tend to be more active users of social media than other age ranges (e.g., ages 60 and older). As another example, if the customer resides in a location that typically experiences snow during the winter season, and the incoming first version of the message includes a date that falls during the winter season (e.g., a day in December), the additional textual content generated for the second version of the message may include a product or service recommendation suitable for the winter season, such as for scarves, gloves, and earmuffs, or any other item previously purchased by the customer during the winter season (e.g., according to historical data 165).

To assist with these customization enhancements, the automated agent messaging application may be configured to apply one or more machine learning models (e.g., automated agent messaging model 158). Generally speaking, automated agent messaging model 158 may implement clustering, regression, neural networks, or other suitable machine learning techniques, and may include multiple models. In some embodiments, the automated agent messaging application may be configured to apply the automated agent messaging model 158 to the plurality of predefined messages in an initial language (e.g., English) stored in the database to thereby generate an output indicative of corresponding translated messages in a different language (e.g., Spanish). These translated messages serve to localize the messages and support AAMS 100 interacting with customers in multiple languages (e.g., English, Spanish, German, etc.). The automated agent messaging model 158 may have been trained, e.g., via model trainer 148, based on a machine analysis of multilingual data. The multilingual data may be text representations of interactions with users (e.g., customers) along with corresponding intents, entities, sentiment, or variables corresponding to those user interactions, as well as translated versions of those text representations.

In some embodiments, the automated agent messaging application may be configured to apply the automated agent messaging model 158 to items included in a customer's order to thereby generate an output indicative of one or more selected products and related subsequent customer activities related to the selected product(s). The automated agent messaging model 158 may have been trained, e.g., via model trainer 148, based on a machine analysis of enterprise historical data (e.g., historical data 165) indicative of a plurality of orders which have been placed by a plurality of customers for pickup, items included in the plurality of orders, and subsequent customer activities related to the orders and/or ordered items to determine an item of the customer's order which has a higher degree of association to occurrences of subsequent customer activities as compared to other items in the customer's order, and to determine one or more subsequent customer activities that have respective higher degrees of association to the determined ordered item as compared to other subsequent customer activities. That is, by applying the trained automated agent messaging model 158 to the items included in the order of the customer, the trained automated agent messaging model 158 determines or predicts the one or more particular items of the order which are the mostly likely, among the set of items of the order, to have an occurrence of a subsequent customer activity related to the one or more particular items, and the trained automated agent messaging model 158 also determines or predicts the mostly likely type of subsequent customer activit (ies) for the one or more particular items. Subsequent customer activities related to an ordered item may include various types of customer-initiated actions related to the ordered item. For example, a subsequent customer activity related to purchasing face cream may include the customer purchasing a hand lotion shortly afterwards. As another example, a subsequent customer activity related to a prescription may include the customer calling the enterprise to speak to a pharmacist about usage, drug interactions with over-the-counter medications, whether or not the medication should be taken with food, etc. In another example, a subsequent customer activity related to a beauty product may include searching (e.g., via application 112b, 120b, 160b) for related beauty products by the same manufacturer. Of course, other types and contents of subsequent customer activities related to ordered items are possible.

Based on the output of the automated agent messaging model 158 (e.g., based on the determined item(s) of the customer's order and the determined subsequent customer activit(ies)), the automated agent messaging application may generate additional textual content to add to the second version of the message. For example, when the customer's order includes a face cream, the trained automated agent messaging model 158 may determine that the most likely subsequent customer activity related to the hand cream is a purchase of hand lotion. Thus, in this example, to further personalize and/or contextualize the second version of the message "Hello, thank you for shopping with us. We hope you are enjoying your latest purchase. Would you like to hear about specials for similar products?", the automated agent messaging application may generate the following second version of the message: "Hello, thank you for shopping with us. We hope you are enjoying your latest purchase of the face cream. Would you like to hear about specials for hand lotions?"

In some embodiments, the automated agent messaging model 158 may be trained to determine the selected item(s) and related subsequent customer activit(ies) further based on characteristics associated with the plurality of historical customer orders in addition to the items of the order. The additional characteristics may include, for example, a status or stage of fulfillment of the order, customer preferences, customer history of subsequent customer activities related to specific items which were ordered (and optionally picked up), seasonality (e.g., holidays, back-to-school, month of the year, etc.), customer demographics, physical location of the pickup, weather conditions, other external events or conditions (e.g., major sporting events in the vicinity of the location, convention or conference activity in the vicinity of the location, proximity of location to office buildings or schools, etc.), to name a few. In these embodiments, the automated agent messaging application may apply the automated agent messaging model 158 to the order as well as to indications of one or more other characteristics to determine the specific item or items of the order and subsequent customer activit(ies) to thereby generate the second version of the message. For example, the automated agent messaging application may suggest, within the second version of the message, products or other information (e.g., social media pages) based on current conditions and/or events proximate to the location 102 (e.g., weather, sports events, etc.), information on current store promotions, coupons on other items which the customer has previously purchased or electronically viewed, demographics of the customer (e.g., address, age group in which the customer belongs), etc. The automated agent messaging application may obtain some of the additional characteristics (such as customer preferences and demographics) from the customer profile 162, for example. The automated agent messaging application may query other components of AAMS 100 to obtain other characteristics, such as weather conditions, external events or conditions, time of day/month/date/season, etc.

After the automated agent messaging application generates the second version of the electronic message, the method 200 at block 206 may include transmitting the second version of the electronic message to a computing device (e.g., device 103, PED 115) via a network (e.g., network 130). In some embodiments, the automated agent messaging application transmits the second version of the electronic message to the same computing device that transmitted the first version of the electronic message (i.e., device 103 operated by the agent), so that the agent can provide the second version of the electronic message directly to a computing device (e.g., PED 115) operated by the customer. In other embodiments, the automated agent messaging application transmits the second version of the electronic message directly to the computing device operated by the customer on behalf of the agent.

In some embodiments, after transmitting the second version of the electronic message to a computing device operated by an agent, the method 200 at block 208 may include receiving feedback for the second version of the electronic message from the agent. The feedback may be a response electronic message indicating text, satisfaction rating, or other suitable representation to indicate how accurately the second version of the electronic message automatically generated at block 204 captures the intent of the agent's first version of the message. Upon receiving the feedback, the method 200 at block 210 can include updating the one or more machine learning-based models used to generate the second version of the electronic message if necessary. For example, the automated agent messaging application can update the NLU model 157 to improve its capabilities for determining the intent of the first version of the electronic message, such as by adjusting the linguistic rules and/or the manner in which content included in the first version of the electronic message is broken down into smaller elements. As another example, the automated agent messaging application can update the automated agent messaging model 158 or database (e.g., historical data 165) to further develop degrees of association between various ordered items and one or more subsequent customer activities. The automated agent messaging application may also add additional database entries for newly determined intents (as indicated by the feedback). In some cases, the automated agent messaging application may convert the feedback into training data, to feed to the NLU model 157, automated agent messaging model 158, or both.

Although the embodiments pertaining to feedback described above refer to the agent's feedback (i.e., in response to the method 200 transmitting the second version of the electronic message to a computing device operated by the agent) for improving the capabilities of the enterprise computing system to determine the intent and/or context of the first version of the electronic message, the feedback in other embodiments may refer to the customer's feedback (i.e., in response to the method 200 transmitting the second version of the electronic message to a computing device operated by the customer). For example, the customer may provide a feedback in the form of an electronic message indicating "No, I don't want to purchase hand lotion, I want to purchase lip stick." In this example, the automated agent messaging application may adjust the automated agent messaging model 158, so that the automated agent messaging model 158 updates its degrees of association between the purchase of face cream and the purchase of lip stick.

Accordingly, the enterprise computing system and techniques discussed in FIG. 2 and elsewhere enable computers to intelligently generate, in real-time, electronic messages for electronic devices, and to provide other contextualized information in the generated messages. Indeed, as the systems and techniques discussed herein may use one or more specially trained machine learning models (e.g., as is discussed in more detail with respect to FIG. 3), the enterprise computing system may offer standardized, yet also customized messages, which are more relevant to and/or requested by the agent than agent interfaces which only provide a pre-determined set of system responses. That is, the enterprise computing system does not simply utilize canned responses and/or a discrete, pre-determined decision tree to provide rote responses to the agent, but automatically refines and augments electronic messages received from agents to provide enhanced messages and other value-add information which are customized to the customer.

Figure 3:
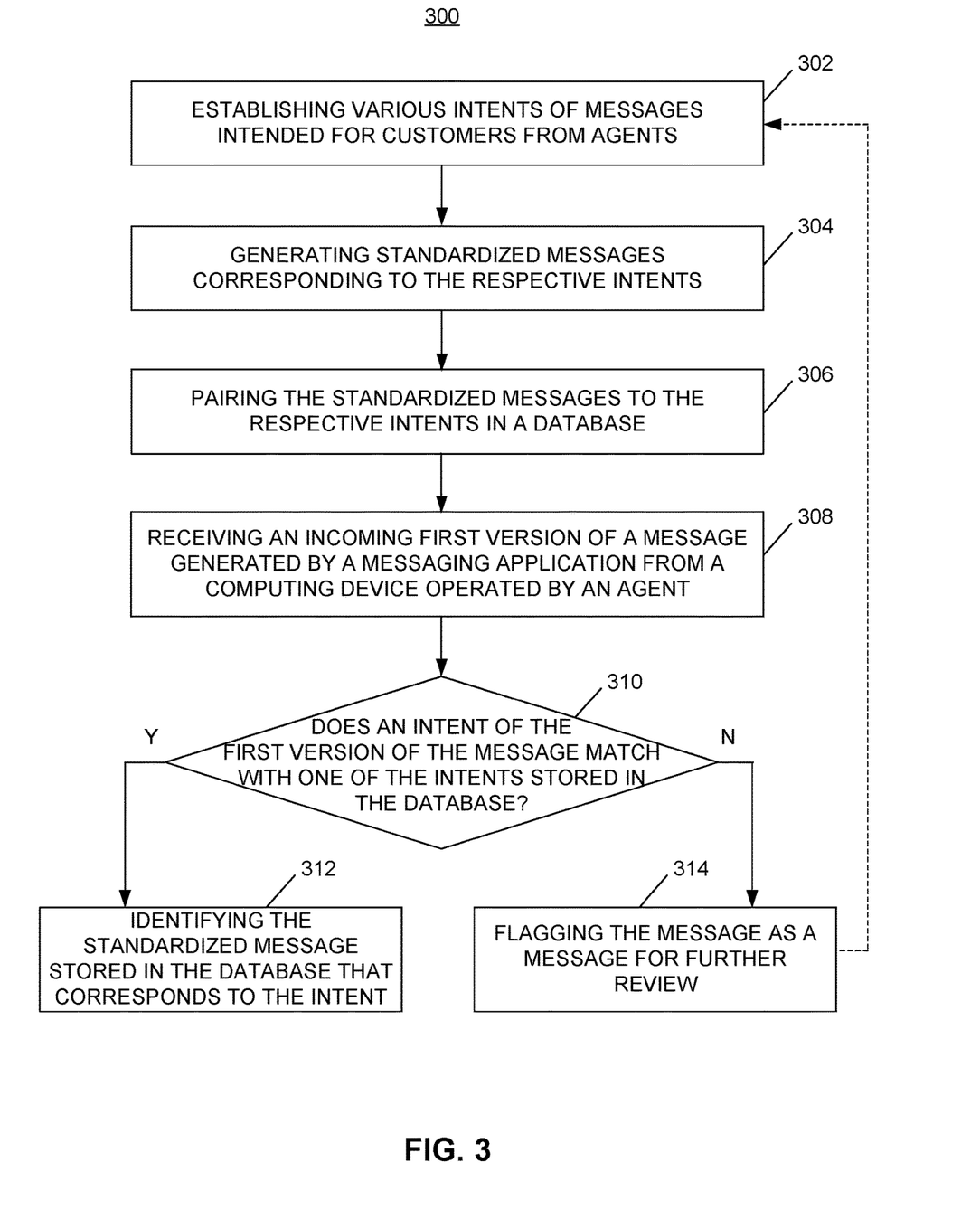
FIG. 3 depicts a flow chart of an example method for configuring the example system of FIG. 1 to, in response to receiving first versions of messages, generate second versions of those messages.

FIG. 3 depicts a flow chart of an example method 300 for configuring, e.g., via the automated agent messaging application or module 145, the enterprise computing system (e.g., server 132) to, in response to receiving first versions of messages, generate second versions of those messages. The method 300 may operate in conjunction with embodiments of at least portions of AAMS 100 of FIG. 1 and/or other systems, processors, databases, and/or devices. For ease of discussion herein, and not for limitation purposes, the method 300 is discussed with simultaneous reference to FIG. 1. Additionally, in some embodiments, at least some portions of the method 300 may execute in conjunction with embodiments of the method 200 of FIG. 2. For example, some portions of the method 300 may execute prior to executing the method 200, e.g., to initially establish a mapping between intents and respective predefined messages, and/or some portions of the method 300 may be executed after executing the method 200, e.g., to update the mapping. Further, the method 300 may include additional or alternate steps other than those described with respect to FIG. 3, in embodiments.

At block 302, the method 300 includes establishing various intents of messages intended for customers from agents. For example, the method 300 may establish the following intents: "greeting," "personal narrative," "follow-up," and "product recommendation." In some embodiments, the various intents may be automatically generated by an NLU model (e.g., NLU model 157) based on an analysis of a plurality of messages stored as historical data (e.g., historical data 165) related to the enterprise, and provided from the NLU model to the automated agent messaging application or module 145. In some embodiments, the various intents may be initially generated by an administrator after manually reviewing one or more messages intended for a customer. In some cases, the intents and corresponding messages reviewed by the administrator may serve as training data to the NLU model to further improve the capabilities of the NLU model.

At block 304, the method 300 includes generating standardized messages corresponding to the respective intents. For example, the automated agent messaging application may enable an administrator to provide the following standardized messages for the intents of greeting, personal narrative, follow-up, product recommendation, respectively: "Hello, thank you for shopping with us," "Did you enjoy your vacation?," "We hope you are enjoying your latest purchase," and "Would you like to hear about specials for similar products?" In some cases, the standardized messages may include context indicators (e.g., "X", "Y") recognized by the automated agent messaging application for replacing the context indicators with dynamically pulled contextual information (e.g., recently purchased items, and historically purchased items stored as historical data 165, respectively). For example, the automated agent messaging application may, upon detecting context indicators "X" and "Y" in the standardized messages of "Hello, thank you for shopping with us," "We hope you are enjoying your latest purchase of X," and "Would you like to hear about specials for Y?," output the standardized yet customized message of "Hello, thank you for shopping with us," "We hope you are enjoying your latest purchase of face cream," and "Would you like to hear about specials for hand lotions?"

At block 306, the method 300 includes pairing the standardized messages to the respective intents in a database (e.g., historical data 165), such as a structured query language (SQL) database, a NoSQL database, a flat file storage system, or any other suitable database. In this way, the database may store a plurality of predefined standardized messages that are indexed to a plurality of respective intents as a baseline for assessing actual incoming first versions of messages to generate second versions of those messages in real-time.

At block 308, the method 300 includes receiving an incoming first version of a message generated by a messaging application (e.g., applications 112a, 160a or browser 120a) from a computing device (e.g., device 103) operated by an agent. In some implementations, the automated agent messaging application may receive the first version of the message from the messaging application via a network (e.g., network 130).

At block 310, the method 300 includes determining whether an intent of the first version of the message matches with one of the intents already established at block 302. In some implementations, the automated agent messaging application may first invoke the NLU model to process the first version of the message to determine its intent. After acquiring the intent from the NLU model, the automated agent messaging application may then generate a database query in a suitable structured query language (e.g., SQL) to determine whether the intent has already been established and stored in the database.

If at block 310 the automated agent messaging application is able to locate the intent as an intent that has already been paired with a standardized message in the database at block 306, the method 300 at block 312 includes identifying the standardized message that corresponds to the intent. This standardized message may be output as the second version of the message corresponding to the incoming first version of the message.

If at block 310 the automated agent messaging application is unable to locate the intent as an intent that has already been paired with a standardized message in the database at block 306, the method 300 at block 314 includes flagging, e.g., by the automated agent messaging application, the first version of the message as a message that requires further review. In some implementations, the first version of the message may be stored in the database with a searchable indicator, so that when an administrator generates a database query including the searchable indicator, the administrator may pull the first version of the message for further review. In some cases, the administrator may discard the first version of the message, such as when the intent of the first version of the message is not appropriate to convey to the customer. In other cases, the administrator may recognize that the intent of the first version of the message should be added to the already existing intents established at block 302. Accordingly, the method 300 may proceed to block 302 in response to flagging the message at block 314. In this way, the baseline of a plurality of predefined standardized messages that are indexed to a plurality of respective intents may increase as additional messages are assessed via the automated agent messaging application.

As such, when the enterprise computing system executing the method 300 described above receives a first version of an electronic message from an agent intended for a customer, the enterprise computing system may (i) utilize the NLU model to first determine the intent(s) of the first version of the electronic message, and then (ii) utilize the automated agent messaging application to generate a second version of the electronic message by mapping the intent(s) as determined by the NLU model to the intent(s) corresponding to predefined messages already established in the database. In embodiments in which context indicators are utilized, the enterprise computing system may further utilize an automated agent messaging model 158 to dynamically pull information indicative of one or more selected products and related subsequent customer activities related to the selected product(s). Further, the plurality of predefined messages stored in the database can be expanded upon to include additional messages as a result of iterations of the automated agent messaging application generating messages.

Thus, in view of the above, the novel systems, methods, and techniques disclosed herein are able to automatically refine and augment electronic messages received from agents to provide enhanced messages and other value-add information which are customized to the customer.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including rules, applications, or instructions. These may constitute either software (e.g., code embodied on a machine-readable medium or in a transmission signal) or hardware, such as tangible processing units capable of performing certain operations and may be configured or arranged in a certain manner. In example embodiments, one or more computer component systems (e.g., PED 115, computing device 103, server 132, etc.) or one or more hardware modules of a computer system (e.g., a processor or a group of processors) may be configured by software (e.g., an application or application portion) as a hardware module that operates to perform certain operations as described herein.

In various embodiments, a module may be implemented mechanically or electronically. For example, a module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by price and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within an enterprise environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within an enterprise environment or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "embodiments," "one embodiment," or "an embodiment" means that a particular element, feature, structure, or characteristic described in connection with the embodiment is included in at least one embodiment. The appearances of the phrase "embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application. This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed:

1. A method for assessing electronic messages exchanged between messaging applications, the method comprising:
   receiving, by a computing system of an enterprise via one or more networks, an electronic message generated by a messaging application for review by an automated agent messaging application prior to delivery of the electronic message to an electronic device operated by a customer, the electronic message having textual content intended for the customer from an agent associated with the enterprise;
   accessing, by the automated agent messaging application, historical data stored at the computing system, wherein the historical data is specific to the customer and was collected separately from the messaging applications;
   in response to receiving the electronic message, automatically generating, by the automated agent messaging application using one or more machine learning-based models and the historical data, a revised version of the electronic message approved by the enterprise for delivery to the electronic device, wherein the one or more machine learning-based models are responsive to previous interactions of the messaging applications, wherein the revised version of the electronic message is an adaptation of the textual content while maintaining an intent corresponding to each of one or more portions of the textual content, each of the one or more portions of the textual content being replaced with defined textual content associated with the one or more machine learning-based models, and wherein the revised version of the electronic message includes additional textual content selected to be added to the revised version from defined additional textual content associated with the one or more machine learning-based models based on the historical data, the additional textual content being separate from any intent corresponding to each of the one or more portions; and
   automatically transmitting, to the electronic device, the revised version of the electronic message.

2. The method of claim 1, wherein automatically generating the revised version of the electronic message comprises:
   applying a natural language understanding (NLU) model to the textual content included in the electronic message to thereby determine the intent of the electronic message.

3. The method of claim 2, wherein automatically generating the revised version of the electronic message further comprises:
   querying a plurality of predefined messages indexed to a plurality of respective intents; and
   when the determined intent is included in the plurality of respective intents, selecting one of the plurality of predefined messages that is indexed to the determined intent as the revised version of the electronic message.

4. The method of claim 3, wherein automatically generating the revised version of the electronic message further comprises:
   generating the additional textual content to add to the selected one of the plurality of predefined messages.

5. The method of claim 4, wherein automatically generating the additional textual content further comprises:
   applying a machine learning model to generate an output, the machine learning model trained based on a machine analysis of the historical data specific to the customer; and
   generating the additional textual content based on the output of the machine learning model.

6. The method of claim 2, wherein automatically generating the revised version of the electronic message further comprises:
   querying a plurality of predefined messages indexed to a plurality of respective intents; and
   when the determined intent is omitted from the plurality of respective intents, defining a new message, indexed to the determined intent, as the revised version of the electronic message.

7. The method of claim 6, wherein the plurality of respective intents is updated to include the determined intent.

8. The method of claim 2, further comprising:
   receiving, from the computing device, feedback for the revised version of the electronic message; and
   updating the NLU model based on the feedback.

9. A server of an enterprise for assessing electronic messages exchanged between messaging applications, the server comprising one or more processors configured to:
   receive, via one or more networks, an electronic message generated by a messaging application for review via an automated agent messaging application executable by the one or more processors prior to delivery of the electronic message to an electronic device operated by a customer, the electronic message having textual content intended for the customer from an agent associated with the enterprise;
   access, via the automated agent messaging application, historical data stored at the server, wherein the historical data is specific to the customer and was collected separately from the messaging applications;
   in response to the electronic message, automatically generate, via the automated agent messaging application using one or more machine learning-based models and the historical data, a revised version of the electronic message approved by the enterprise for delivery to the electronic device, wherein the one or more machine learning-based models are responsive to previous interactions of the messaging applications, wherein the revised version of the electronic message is an adaptation of the textual content while maintaining an intent corresponding to each of one or more portions of the textual content, each of the one or more portions of the textual content being replaced with defined textual content associated with the one or more machine learning-based models, and wherein the revised version of the electronic message includes additional textual content selected to be added to the revised version from defined additional textual content associated with the one or more machine learning-based models based on the historical data, the additional textual content being separate from any intent corresponding to each of the one or more portions; and automatically transmit, to the electronic device, the revised version of the electronic message.

10. The server of claim 9, wherein the one or more processors are configured to automatically generate the revised version of the electronic message by applying a natural language understanding (NLU) model to the textual content included in the electronic message to thereby determine the intent of the electronic message.

11. The server of claim 10, wherein the one or more processors are configured to automatically generate the revised version of the electronic message by:

querying a plurality of predefined messages indexed to a plurality of respective intents; and when the determined intent is included in the plurality of respective intents, selecting one of the plurality of predefined messages that is indexed to the determined intent as the revised version of the electronic message.

12. The server of claim 11, wherein the one or more processors are configured to automatically generate the revised version of the electronic message by generating the additional textual content to add to the selected one of the plurality of predefined messages.

13. The server of claim 12, wherein the one or more processors are configured to automatically generate the additional textual content by:

applying a machine learning model to generate an output, the machine learning model trained based on a machine analysis of the historical data specific to the customer; and generating the additional textual content based on the output of the machine learning model.

14. The server of claim 10, wherein the one or more processors are configured to automatically generate the revised version of the electronic message by:

querying a plurality of predefined messages indexed to a plurality of respective intents; and when the determined intent is omitted from the plurality of respective intents, defining a new message, indexed to the determined intent, as the revised version of the electronic message.

15. A computing device for assessing electronic messages exchanged between messaging applications, the computing device comprising:

memory storing a messaging application; and one or more processors coupled to the memory, wherein the one or more processors are configured to execute the messaging application to:

receive an electronic message for review prior to delivery of the electronic message to an electronic device operated by a customer, the electronic message having textual content intended for the customer from an agent associated with an enterprise;

access historical data stored at a computing system associated with the computing device, wherein the historical data is specific to the customer and was collected separately from the messaging applications;

automatically generate, using one or more machine learning-based models and the historical data, a revised version of the electronic message approved by the enterprise for delivery to the electronic device, wherein the one or more machine learning-based models are responsive to previous interactions of the messaging applications, wherein the revised version of the electronic message is an adaptation of the textual content while maintaining an intent corresponding to each of one or more portions of the textual content, each of the one or more portions of the textual content being replaced with defined textual content associated with the one or more machine learning-based models, and wherein the revised version of the electronic message includes additional textual content selected to be added to the revised version from defined additional textual content associated with the one or more machine learning-based models based on the historical data, the additional textual content being separate from any intent corresponding to each of the one or more portions; and automatically transmit, to the electronic device via one or more networks, the revised version of the electronic message.

16. The computing device of claim 15, wherein the one or more processors are configured to automatically generate the revised version of the electronic message by applying a natural language understanding (NLU) model to the textual content included in the electronic message to thereby determine the intent of the electronic message.

17. The computing device of claim 16, wherein the one or more processors are configured to automatically generate the revised version of the electronic message by:

querying a plurality of predefined messages indexed to a plurality of respective intents; and when the determined intent is included in the plurality of respective intents, selecting one of the plurality of predefined messages that is indexed to the determined intent as the revised version of the electronic message.

18. The computing device of claim 16, wherein the one or more processors are further configured to:

display, via a screen associated with the computing device, the revised version of the electronic message simultaneously with the electronic message; and receive, from the agent, a selection of the revised version of the electronic message, wherein the one or more processors are configured to transmit the revised version of the electronic message after receiving the selection of the revised version of the electronic message.

* * * * *